United States Patent
Von Klenck

[11] 3,859,933
[45] Jan. 14, 1975

[54] WASTE DISPOSAL METHOD AND SYSTEM

[75] Inventor: Jurgen Von Klenck, Dusseldorf, Germany

[73] Assignee: Mannesmann Aktiengesellschaft, Dusseldorf, Germany

[22] Filed: Aug. 22, 1973

[21] Appl. No.: 390,411

[30] Foreign Application Priority Data
Aug. 23, 1972 Germany............................ 2242012

[52] U.S. Cl.................. 110/8 R, 110/8 A, 110/15, 110/31, 210/63
[51] Int. Cl............................................. F23g 7/00
[58] Field of Search............ 110/7 R, 8 R, 15, 18 R, 110/31, 8 C, 8 A; 48/209; 23/262; 210/9, 10, 40, 63

[56] References Cited
UNITED STATES PATENTS

| | | |
|---|---|---|
| 3,652,405 | 3/1972 | Hess et al. ........................... 110/8 X |
| 3,716,339 | 2/1973 | Shigaki ............................. 110/15 X |
| 3,725,538 | 4/1973 | Brewer............................... 110/8 X |
| 3,733,271 | 5/1973 | Olsen................................ 110/15 X |

*Primary Examiner*—Kenneth W. Sprague
*Attorney, Agent, or Firm*—Ralf H. Siegemund

[57] ABSTRACT

In a method for the combined processing for disposal of industrial, problem waste, of problem free waste and of slush as resulting from sewage treatment, wherein the problem waste is pyrolytically carbonized on a continuous, revolving basis, and wherein the resulting coke is mixed with heated acidized slush, filtered and drained. The gas developed during carbonization is washed and used as heating agent; the mixture is then mixed with problem free waste to obtain a coke-slush waste mixture and the said latter mixture is burnt.

11 Claims, 7 Drawing Figures

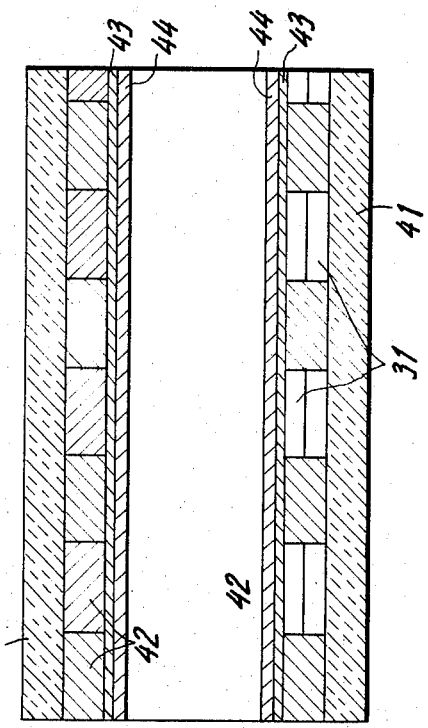
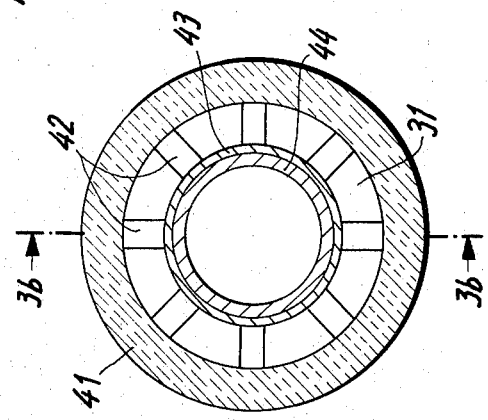
Fig. 3b
Fig. 3a

WASTE DISPOSAL METHOD AND SYSTEM

BACKGROUND OF THE INVENTION

The present invention relates to a method and system for pollution free treatment and destructively processing of waste such as of industrial waste as well as garbage, refuse or the like as being produced in residential areas and combining therewith sediments and slush from sewage treatment plants or the like. The invention relates particularly to a method and system wherein industrial waste is pyrolytically treated (indirect heating) to carbonize industrial waste so as to reduce it to coke and the sewage plant slush is mixed with that coke and filtered therewith for draining and partially dehydrating the coke-slush mixture, that mixture is then burnt in a non-polluting manner.

The destructive disposal of waste in a manner which does not damage the environment is a significant present day problem. The problem results specifically from the very large variety of waste products that arise under different circumstances. Highly industrialized areas experience these difficulties as resulting from difficult-to-treat varieties of waste to a very significant degree. So-called problem waste is composed to a considerable extent of organic compounds, i.e., synthetics and plastic. The chemical industry and related activities produce a particularly large quantity of such problem waste. After separating the wet constitutents from that kind of waste, one can burn the dry residue but burning generally produces smoke and fumes which pollute and contaminate the environment, unless these gases are cleaned at great expenditure.

Another problem area is the processing of slush and sediments which result from sewage treatment, particularly where sewage is combined from industrial and residential areas in cities. Again, one can burn the residue after draining and dehydrating the slush, but pollution problems arise also here particularly in view of the large (chemical) variety of this residue. Also, dehydrating the slush is often a very difficult problem, requiring solutions that are quite expensive.

A known method processes fragmentized waste in a vertical container which is heated indirectly from the outside to obtain pyrolytic reduction of the waste to coke. Thus resulting gas is withdrawn from the container through its bottom, washed for removing $CO_2$, HCL, $H_2S$ and $NH_3$, and then used as heating fuel. The coke is then mixed with neutralized sewage plant slush which thereupon is drained. The resulting water is filtered out. The resulting (residual) mixture is then heat treated through hot air for evaporating the remaining water. The more or less dry residue can then be used as agricultural fertilizer.

The method as described has the drawback that the original waste must be ground or crushed for fragmentizing and the through-put is relatively small (for a given size container). Increase in through-put by means of diameter increase of the container is not possible beyond a certain limit posed by the pyrolytic-temperature conditions for carbonizing; the temperature differences in the container become too large so that uniformity in the carbonizing process is no longer warranted.

SUMMARY OF THE INVENTION

It is an object of the present invention to avoid the drawbacks outlined above and to suggest method and equipment particularly for treating problem waste together with regular or problem free waste as well as sewage plant slush. It is another object of the present invention to provide for method and equipment of treating such waste products on a large scale basis and a pollution free manner, i.e., without contaminating the environment.

In accordance with the preferred embodiment of the invention, it is suggested to feed problem waste to a carbonizing oven for indirect heating while circulating under exclusion of air, so that the waste is continuously agitated during progressive carbonization. Upon removal from the coking facility on a continuous basis acidized sewage slush is heated to a temperature from 60° to 80° centigrade and mixed with the coke for draining. The mixture is preferably neutralized thereafter with lime, drained and the mixture is then burnt together with the problem free waste. The coke-slush mixture is drained, i.e., partially dehydrated to a solid content of at least 30 percent prior to burning.

The gas developed during carbonizing the problem waste contains hydrogen, carbon oxide, some carbonhydrates, $H_2S$, HCL and, for example, some PVC waste. Accordingly, this gas is cleaned by washing, whereby watery hydrochloric acid and either $H_2S$ or just sulphur, depending on the mode and manner of washing, is processed to make sulfuric acid. Alternatively, the sulphur can be burnt to obtain $SO_2$ and that oxide, in turn, can be used to decontaminate slush or liquids containing chromium. After such purification, the coke gas can be used for indirectly heating the waste in the coking furnace.

The coke produced upon degassing problem waste is very well suited for draining the slush developed in sewage treatment plants. The slush is preferably thickened first to have about 7 percent dry substance. Draining of the mixture may result simply by settling and centrifuging continuously the slush-coke mixture so as to remove moisture until combustion can be sustained. About 30 percent and up dry substance is required.

The method in accordance with the invention is preferably practiced in carbonizing oven constructed as a turning cylindrical oven chamber, which rotates on its longitudinal axis in horizontal or slightly inclined disposition and having an acid proof inner lining. The front ends of that furnace are closoed except for the waste charging opening and the coke removal opening. The furnace is indirectly heated in that the inner lining is provided with ducts for passage of fuel gas. These ducts are connected to receive the cleaned gas developed by the furnace as raw gas. Additionally, the furnace is provided with discharge openings of the burnt smoke gas.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3a and 3b are respectively cross section and longitudinal section through the oven chamber of FIG. 2.

Figure 1:
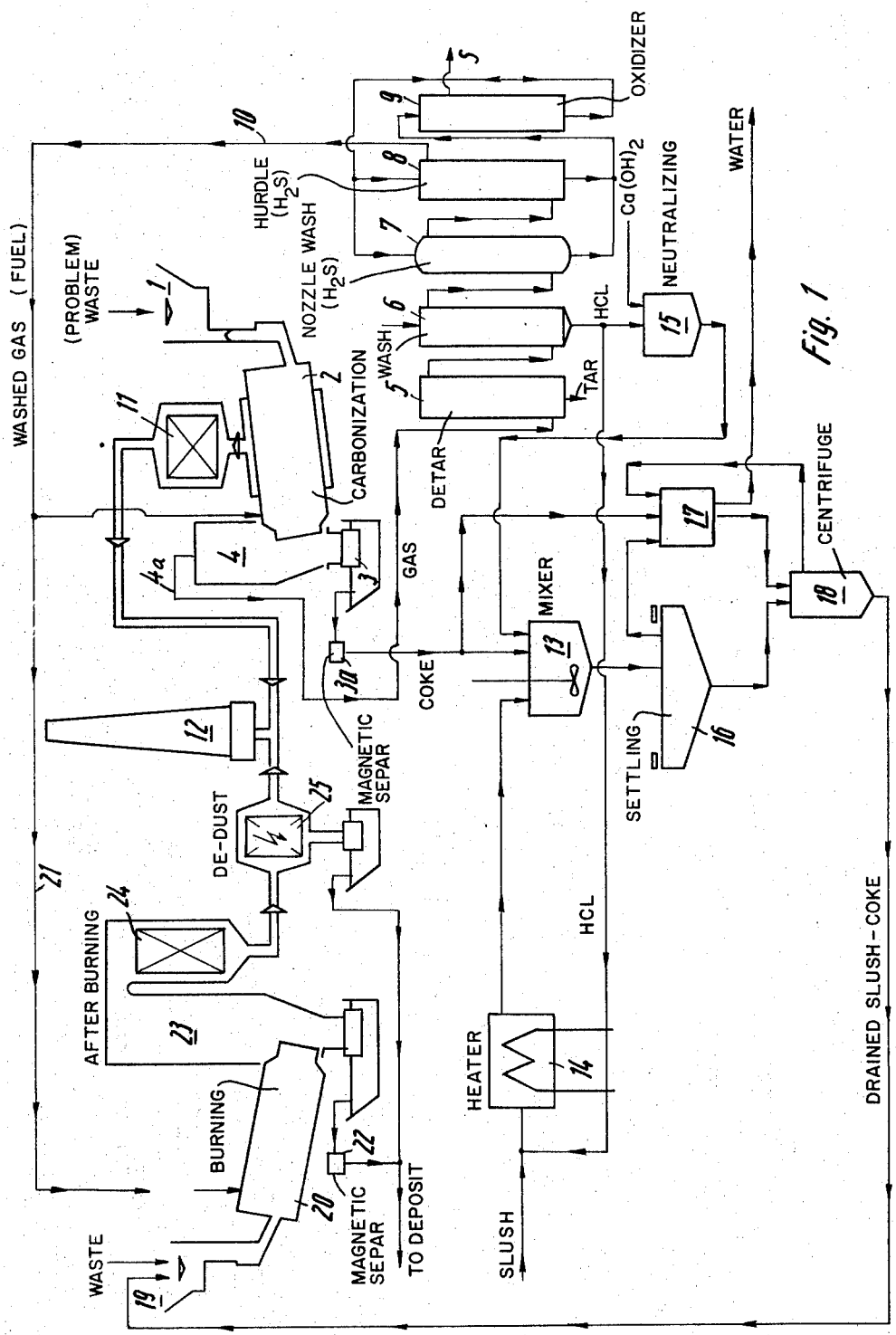
FIG. 1 is a schematic representation of equipment for practicing the method in accordance with the preferred embodiment of the invention.

Proceeding now to the detailed description of the drawings, so called problem waste (such as resulting from and produced in industrial plants) is charged into a funnel. Problem waste is of the variety which will contaminate the environment upon burning because of a high content of organic compounds containing, e.g., sulphur, nitrogen and other contaminants. The input of funnel-shaped hopper 1 is closed by a distributor or bell and hopper-like device. The problem waste is passed to one end of a turning oven drum 2, which rotates about its slightly inclined, predominantly horizontal axis. The waste does not have to be ground or fragmentized otherwise; rather, the continuously revolving oven chamber brakes up the waste material physically and carbonizes it in a continuously progressing process resulting in quite a fine grain coke.

The resulting coke is moved towards the discharge opening of the oven and leaves same for a water seal 3 for quenching. The coke then passes through a magnetic separator 3a for removing iron particles. The gas developed by the carbonizing process is collected in gas chamber 4 of the water seal and withdrawn therefrom via conduit means 4a for passing through cleansing equipment.

The gas cleaning equipment may, for example, be comprised of a tar separator 5, a wet-washing station 6, and a desulfurizing equipment or station 7, operating, for example, on basis of a Stretford system with a nozzle washing device 7a, a hurdle type washer 8 and an oxidizer 9. The stations 5, 6 and 7 are passed through by the gas in that sequence, whereby tar is separately withdrawn from separator 5, and HCL is taken from washer 6. The substations 7a and 8 remove $H_2S$, which is passed the oxydizer 9 for removing the sulphur.

Path 10 denotes the passage way for the cleaned gas, feeding a portion of the gas to the carbonizing oven 2 as fuel gas and for sustaining combustion around the oven chamber accordingly. The burnt fuel gas is discharged through a steam generator 11 and from there to a chimney 12. The oxidizer residue to the extent it is not sulphur (e.g., water) is returned to the washers 7a and 8.

The de-ironed coke passes from separator 3a to a mixer 13 which receives also slush. The slush is taken originally as watery sediment or other solid containing residue from a sewage plant. The slush may have been thickened to some extent, e.g., to have 7 percent content. However, some of the HCL as discharged from washer 6 is added to the slush prior to mixing to increase the acidity thereof. Additionally, the acidized slush is heated in heat exchanger 14 to about 60° to 80° centigrades, and then fed to the mixer 13. Sewage slush and coke are continuously mixed in mixer 13 through stirring.

The mixer receives also white wash or lime solution for neutralizing the slush. For this, lime is mixed in a vessel 15 with the (or some of the) remaining HCL from washer 6, and the output of vessel 15 is then fed to mixer 13 as third feed input.

The coke-slush mixture is discharged from mixer 13 on a continuous basis (feeding is likewise continuous), and passes to a settling equipment 16. The somewhat thickened mixture passes from the settling tank to a centrifuge for draining. The drained or partially dehydrated mixture is then passed to the charge equipment 19 of a turning drum furnace 20. At this point, the solid content of the mixture is at least 30 percent. The so-called problem free waste (from residential areas) is also passed to furnace 20 via input and charge equipment 19. Furnace 20 receives air and burns the mixture it receives by means of conventional combustion. Some of the cleaned coke gas is used here as combustion sustaining fuel (line 21).

Water is in effect removed in settling tank 16 and from the output mixture as provided by mixer 13. Additional water is extracted from the coke-slush mixture by centrifuge 18. This water is fed to a filter 17 which receives some of the coke as filtering agent. The filtered water is actually clean to the extent that permits charging a main canal of the sewage system plant. The exhausted filter substances are fed additionally to centrifuge 18 for drainage and is then passed on to the furnace 20.

The ash development in furnace 20 is passed through a magnetic separator (to remove iron that was received primarily in the problem free waste). The exhaust fumes of furnace 20 (smoke) pass through an after burner chamber 23, a steam generator 24, a dedusting equipment 25 to chimney 12. The dust separated from the smoke in device 25 is discharged from the system together with the ash.

Figure 2:
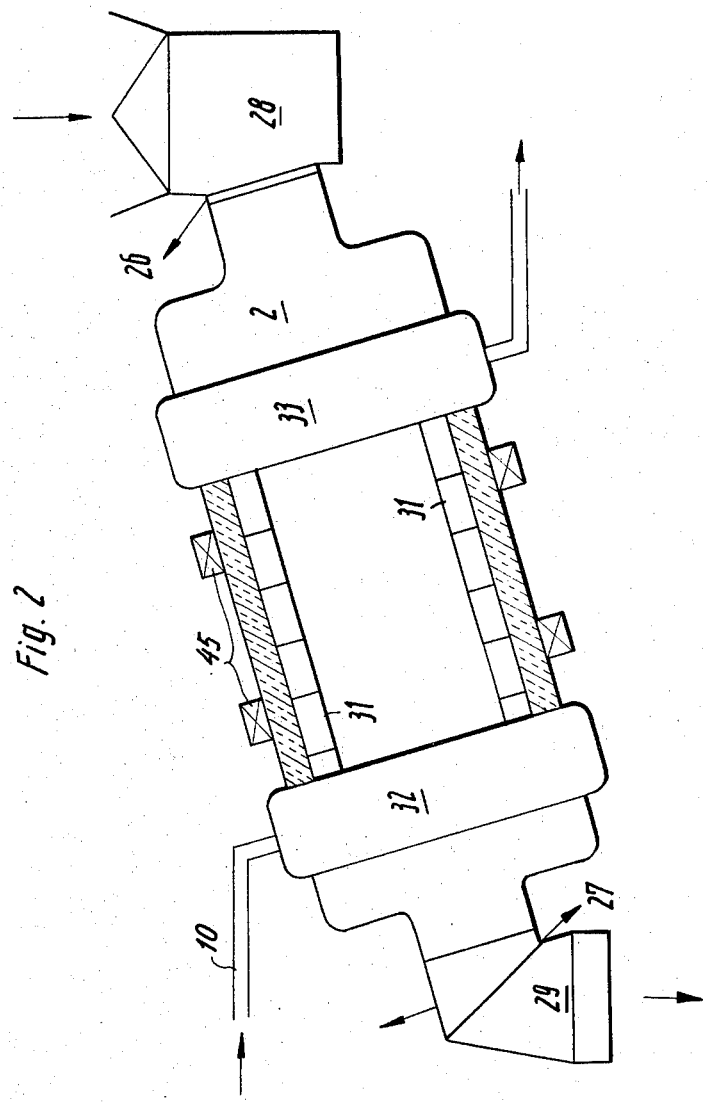
FIG. 2 is a cross section through a coking and carbonizing oven used in the equipment of FIG. 1.

After having described the system for practicing the novel method and process, I turn to FIGS. 2, 3 and 4, showing the particular carbonizing oven 2 and details thereof to be used preferably in the novel system. The longitudinal axis of the oven chamber is somewhat inclined to the horizontal and has a front end 26 higher than the opposite front end 27 (which could also be called the rear end). The end faces 26, 27, of the oven are closed except for the openings to be described next.

The problem waste passes through entrance (or pre-entrance) chamber 28 at front end 26, to the somewhat higher disposed oven chamber end. A coke removal equipment 29 is provided at the somewhat lower end 27. The respective openings in oven end faces 26, 27, respectively, connect to the devices 28, 29.

The oven 2 has an inner lining 20 traversed by heating ducts 31 which, in turn, are connected at 32 for receiving cleaned gas as developed in the oven (line 10 in FIG. 1). Reference numeral 33 refers to smoke removal equipment in the oven.

Figure 4A:
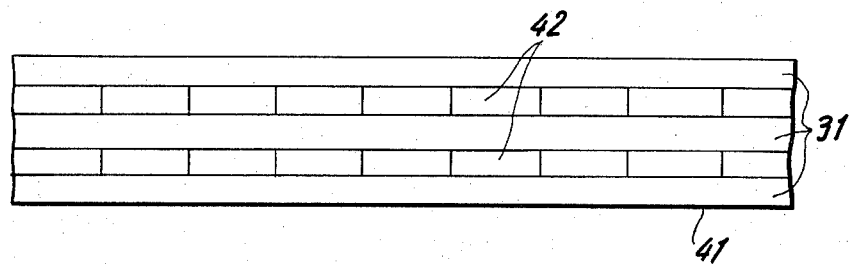
FIGS. 4a, 4b and 4c are examples for arranging heating ducts in such an oven.
Figure 4B:
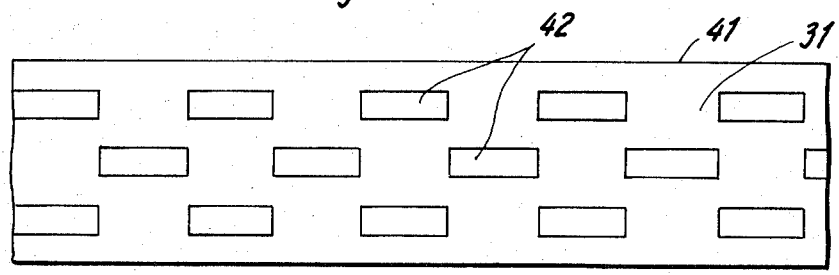
Figure 4C:
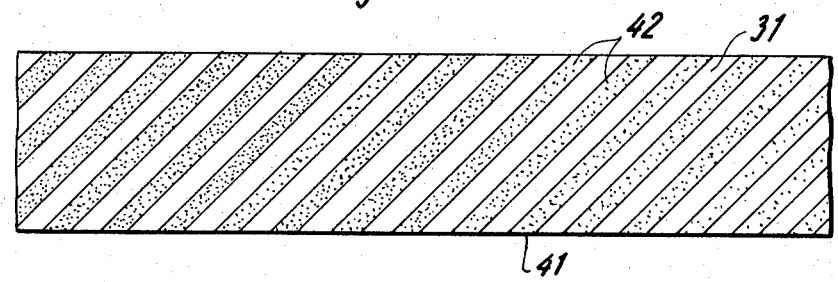

FIGS. 3 and 4 show several different construction features for the heating ducts 31. The oven has an outer layer 41 made of ceramic material and providing for thermal insulation of the heating channels, as well as of the interior of the drum-shaped oven and oven chamber, relative to the steel jacket of the drum (not shown). A second, more internal layer is disposed on layer 41 and made of bricks 42 which are placed in spaced-apart relation to each other, forming one pattern or another as shown also in FIGS. 4a, 4b, 4c, in various examples.

A third layer 43 covers the brick layer in a continuous configuration, so that the heating ducts 31 are, in fact, completely covered. Layer 43 itself may be constructed to be sufficiently wear resistant. However, layer 43 may, in turn, be covered by an innermost lining 44 for providing a wear resisting layer as facing the content of the oven, which tumbles therein upon rotation of the drum.

The bricks 42 can be placed in various configurations as shown in development views of FIGS. 4a, 4b and 4c. These Figures could also be interpreted as views of the oven from the inside with internal covers 43, 44, removed and simplified as to illustration of curvature.

FIG. 4a shows the bricks 42 arranged axially to establish axial ducts as heating ducts 31. FIG. 4b shows a staggered arrangement of the bricks 42, and the heating duct is a cylindrical space between layers 41 and 43 with bricks 42 establishing layer supporting obstacles. Still alternatively, the bricks 42 can be arranged along helical lines (FIG. 4c) to provide for helical heating ducts 31. The ducts will end adjacent the charge end (26) of the oven, there being openings in the otherwise all encladding layer 41 as well as in the steel jacket of the turning oven. The smoke and fumes produced by combustion of the gas in the ducts 31 can escape through these openings accordingly. A cover runs these fumes to the chimney.

The method and system in accordance with the invention produces the following advantageous results:

1. Difficult to treat industrial waste, also called problem waste, is destroyed with a residue in form of slag in furnace 20 which does not contaminate the environment. The combustion fumes are free from contaminants such as HCL and $SO_2$.

2. The large amounts of sewage plant slush are readily drained and treated so that it can be burnt without causing pollution. The slag as resulting from burning the drained slush is not a contaminant, can easily be disposed and the smoke is likewise free from pollutants.

3. The drainage water is cleaned within the system to such an extent that it can be discharged into the sewage system, the salts resulting from neutralizing the hydrochloric acid notwithstanding.

The invention is not limited to the embodiments described above but all changes and modifications thereof not constituting departures from the spirit and the scope of the invention are intended to be included.

I claim:

1. In a method for the combined processing for disposal of industrial, problem waste, of problem free waste and of slush as resulting from sewage treatment, wherein the problem waste is pyrolytically carbonized, and wherein the resulting coke is mixed with the slush, filtered and drained, the improvement comprising:
   providing a continuous carbonizing of the problem waste by means of revolving the problem waste while heating it under exclusion of air to obtain coke in a progressing carbonization of the revolving problem waste;
   heating the slush to a temperature of about 60° to 80° centigrade;
   mixing the coke as provided by the carbonization with the heated slush to obtain a coke-slush mixture;
   mixing the mixture with the problem free waste to obtain a coke-slush waste mixture; and
   burning the said latter mixture.

2. Method as in claim 1, including adding acid to the slush prior to heating and neutralizing the heated slush by means of lime.

3. Method as in claim 1, wherein the coke-slush mixture is drained to a dry product content of at least 30 percent.

4. Method as in claim 1, wherein the carbonizing step uses a revolving oven rotating on a horizontal or slightly inclined axis.

5. Method as in claim 4, using an acid-proof oven with closed front ends respectively, for charging the rotating oven with unfragmentized problem waste at one front end and dischraging coke coke at the opposite end.

6. Method as in claim 4, wherein the oven has enclosed duct means, and conducting fuel gas from the oven through said duct means.

7. Method as in claim 6, and including, extracting gas from the carbonizing process, cleaning the extracted gas; and burning the gas as cleaned is used for sustaining the carbonizing.

8. In a system for treating problem waste, sewage plant slush and problem free waste, comprising:
   means for carbonizing the problem waste under continuous rotation;
   means for heating the slush;
   means for mixing the carbonized problem waste and the heated slush;
   means connected to the means for mixing, for draining the mixed carbonized problem waste and heated slush;
   means connected to the means for draining, for mixing the drained carbonized problem waste and slush mixture with problem free waste; and
   means for burning the latter mixture.

9. In a system as in claim 8, wherein the means for carbonizing includes a carbonizing oven chamber rotating on an approximately horizontal axis, lifted at one end, the problem waste being charged to the oven from that one end and coke being discharged from the opposite end.

10. In a system as in claim 9, wherein the oven chamber is lined by a lining, the lining being traversed by heating ducts.

11. In a system as in claim 8, including means for acidizing the slush prior to heating, and means for neutralizing the treated slush.

* * * * *